Oct. 24, 1950

R. L. WOLD 2,527,046

IRRIGATION SCOOP

Filed March 21, 1947

RUSSELL. L. WOLD
*INVENTOR.*

BY *James H. Littlepage*

Oct. 24, 1950     R. L. WOLD     2,527,046
IRRIGATION SCOOP
Filed March 21, 1947     3 Sheets-Sheet 2

RUSSELL. L. WOLD
*INVENTOR.*

BY *James H. Littlepage*

Oct. 24, 1950   R. L. WOLD   2,527,046
IRRIGATION SCOOP
Filed March 21, 1947   3 Sheets-Sheet 3

RUSSELL. L. WOLD
*INVENTOR.*
BY James H. Littlepage

Patented Oct. 24, 1950

2,527,046

UNITED STATES PATENT OFFICE 2,527,046

IRRIGATION SCOOP

Russell L. Wold, Lihue, Kauai, Territory of Hawaii

Application March 21, 1947, Serial No. 736,196

4 Claims. (Cl. 61—12)

This invention relates to irrigation systems and, more particularly, to a method and apparatus for removing water from a flume.

Since the ancients, irrigation systems have traditionally included a main ditch or flume through which a main water supply courses, and subsidiary supply channels stemming angularly from the flume, and some mechanism for equitably parcelling out water flowing through the flume to the several subsidiary channels. Such mechanisms comprised notches or apertures in the side of the flume, dams or baffles interposed across the flume, or combinations of notches and dams for spilling out the water to the subsidiary channels or the adjacent ground. Both of the prior systems depend primarily on the static pressure of the water and, in turn, its volume at the point of extraction from the flume, and neither takes into account the deletery wrought in impeding the free flow of the water along the flume. While on the one hand the water courses are painstakingly arrayed and dimensioned so as to insure sufficient grade and cross-section for flumes to carry the required volume of water, nevertheless the prior systems, especially the ones utilizing dams or baffles, rely for their functioning on impeding the flow of water at the junction with each subsidiary. The effect was thus to stop, and restart the water at each impedance, so that the volume of water flowing along a flume at any given point depended upon the amount leaking past the preceding impedance. The volume of water handled by the flume was lessened by the frictional reduction of its speed, and even then the amount of water extracted from the flume at the head of a subsidiary was only that which spilled out.

The object of this invention is to provide for the utilization of the dynamic forces of the water flowing through a flume by shaving off a portion of the flowing stream without substantially impeding or slowing down the passing water. More particularly, it is intended to provide for the introduction of what might well be termed a shaving vane, preferably of curved scoop-like form, for deflecting a desired portion of the always swiftly-flowing water to the side of a flume or into the head of a subsidiary channel, thereby introducing relatively little friction in the main course along the flume.

Another object of the invention is to provide a scoop-like vane curved to deflect flume water to one side or the other of the flume, and to provide elements for removably and adjustably mounting the vane in the flume so that vanes of initially similar forms may be differently applied for satisfying needs varying along the length of a flume.

In order to avoid erosion of the soil at the delivery point of the water discharged by the deflecting, or shaving vanes, it is intended to provide for the slowing down of the discharge water after the water has been deflected off from the swiftly flowing flume stream, but before it reached the ground at the side of or below the flume. More particularly, it is intended to impart a swirling motion to the water after it has been scooped from the flume so as to dissipate the force of the water before final delivery.

In the furtherance of these objectives, it is now proposed to provide, in one form of the invention, a curved deflecting vane, or scoop disposed over the side of a flume and having a point, which may be termed a pick-off point, projecting into the stream of flume water. The surface of the scoop extends downstream, but also angles upwardly towards the level of the top edge of the flume, from which level it is deflected to and over one side or other of the flume, simultaneously being given a swirling motion, and finally discharged into a subsidiary channel or furrow.

It is a further object to provide for controlling the pick-off point for the type of scoop which deflects water over the side of a flume. In one form of the invention it is proposed to provide a fin attached to the inner end of the scoop, the fin being responsive to the level and velocity of the water so as to maintain a somewhat constant factor in the effective depth of the pick-off point with respect to the passing water. In another form, it is intended to provide a snoot-like pick-up element which normally lies on the bottom of the flume, but which is joined with the upper portions of the scoop by an extensible connection so that the scoop angle and the upward inclination of the delivery guide may be altered.

These and other objects will be apparent from the following specification and drawings, in which.

Figure 1:
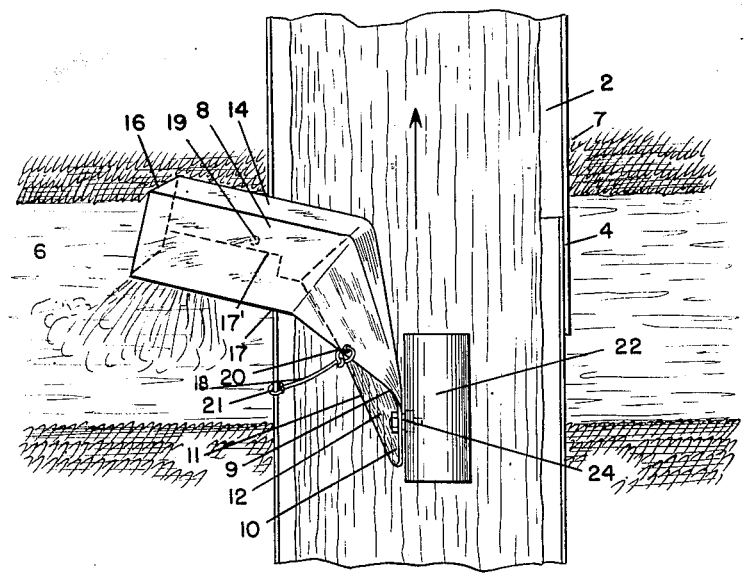
Fig. 1 is a plan view of the scoop in operating position.

Referring now to the drawings, in which similar numerals denote similar elements, the invention is applied to trough-like flumes 2, preferably of sheet metal and laid end-to-end with overlapping ends 4. It should be understood that an array of flumes is disposed across the field to be irrigated, that the several flumes extend lengthwise down an inclination such as a 3% grade and up; that the flumes span a series of furrows 6, and that the flumes themselves are partially embedded in the soil between the furrows, as at 7. The object is to dispense some of the water flowing in the flume to each furrow.

Figure 2:
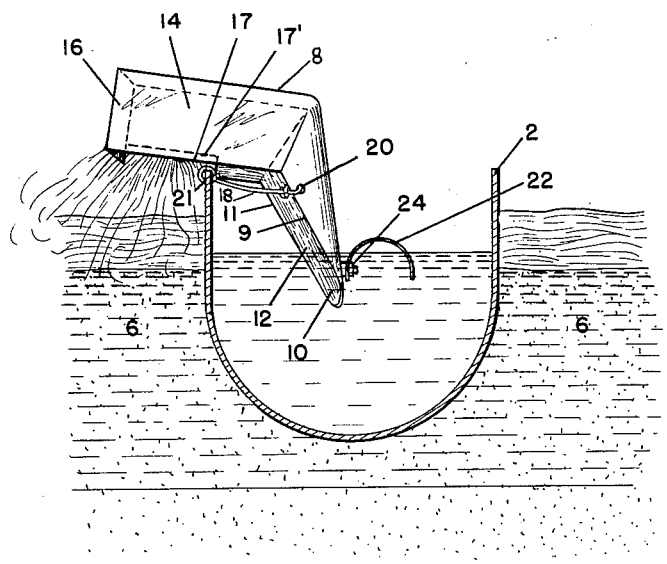
Fig. 2 is a vertical section of the flume taken transversely across Fig. 1, showing the Fig. 1 scoop in front elevation.

The form of the invention illustrated in Figs. 1 and 2 comprises a scoop 8 preferably bent from a blank of sheet metal and including a forwardly directed blade-like edge 9 terminating in a point 10. The trailing edge 11 of the scoop extends upwardly, rearwardly, and towards one side from point 10 so as to present a slightly upwardly-facing, upwardly and rearwardly inclined deflecting surface 12 which, when installed, extends towards one side of the flume. Surface 12, at its upper and rear extremities, merges with an inverted trough portion 14, one rear edge of which is bent inward to form a baffle 16.

Scoop 8 is mounted by resting its lower edges 17 and 17' on the side edge of the flume, and loosely maintained at rest by fastening 17' to the flume by a stiff wire 18 having its end hooked through opening in the flume and scoop, as indicated at 20, 21, and by loosely wiring the scoop adjacent edge 17' to the flume, as indicated at 19.

Water rushing along flume 2 in the direction of the arrow is deflected upwardly along the front surface 12, and would be thrown by its own force in a dispersed pattern were it not for the inverted trough portion 14, which channels the water to form a stream. In order to prevent soil erosion by the channeled stream, baffle 16 swirls the water emitting from the scoop, so that it drops away in other than an unidirectional, jet-like stream.

For a given velocity of water, the amount deflected by scoop 8 depends in part on the depth of point 10 in the stream. In order to adjust the depth of immersion, a curved fin 22 is bolted, as at 24 to the scoop, preferably near point 10. Fin 22, formed of a semi-cylindrical sheet of metal, is attached at 24 to scoop 8 forwardly of its balance point so that its downstream portion tends to hang downwardly, thereby to present its inner surface to the flume stream so as to apply a lifting force to scoop 8. Thus, if the velocity or level of water in the flume varies, the height of point 10 is automatically adjusted accordingly, thereby tending to regulate and maintain uniform the amount of water deflected by scoop 8. Likewise, by adjusting the angle of fin 22 upwardly or downwardly the amount of water delivered may be varied by the resultant depth of immersion of point 10.

Figure 3:
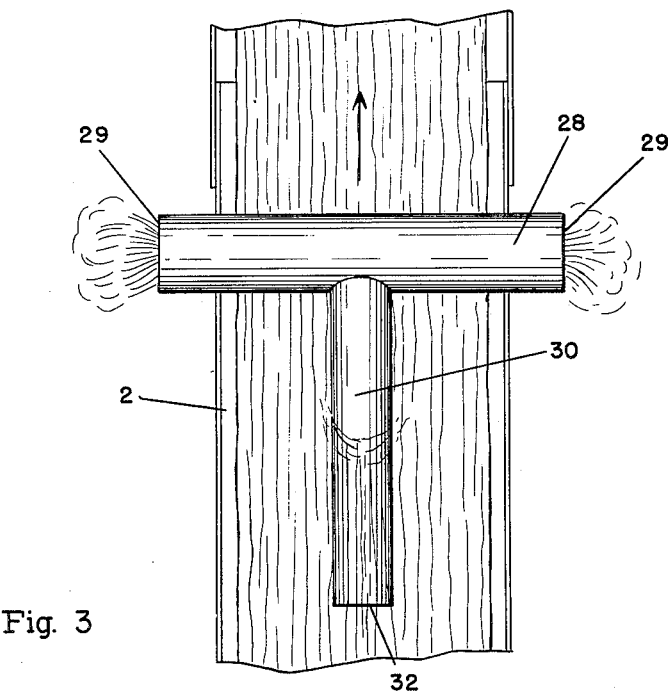
Fig. 3 is a plan view of a modification.
Figure 4:
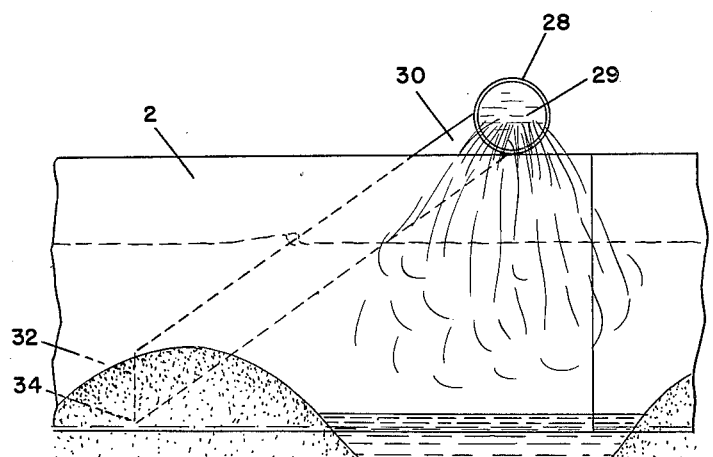
Fig. 4 is a side elevation of the scoop shown in Fig. 3.

In the embodiment illustrated in Figs. 3 and 4, the scoop is generally T-shaped and includes a hollow cross pipe 28 having open ends 29 resting across the top edges of flume 2. A stem-like tube 30 having its bore communicating with the bore of pipe 28 and having an open end 32 extends downwardly so that its lower edge 34 rests on the bottom of the flume. The velocity of the water entering open end 32 forces a stream up the inclined inner surfaces of tube 30, thence into cross-pipe 28 where it is swirled vertically and finally discharged out open ends 29. Pipe 28 may be anchored by suitable wire (not shown) to prevent being washed out of position.

Figure 5:
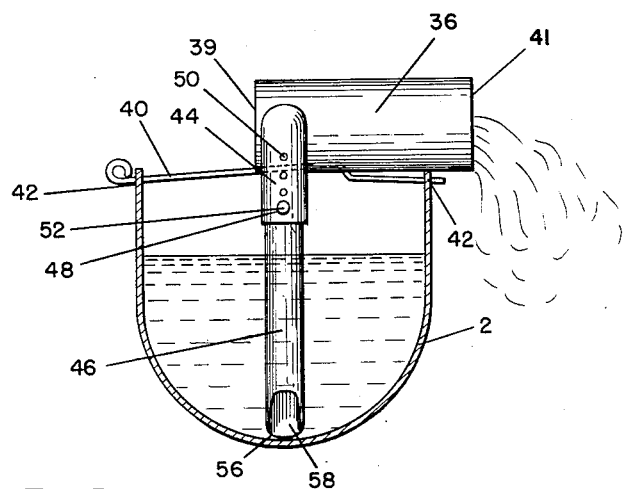
Fig. 5 is a section through a flume showing another modification in front elevation; and, Fig. 6 is a longitudinal, vertical section through the Fig. 5 modification.
Figure 6:
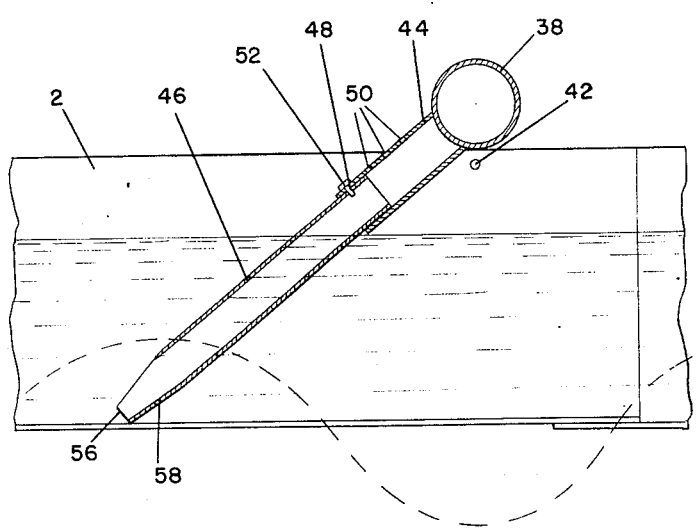

The scoop 36 shown in Figs. 5 and 6 is essentially similar in operation to that shown in Figs. 3 and 4 except in that a can-like member 36 having a closed inner end 39 and an open outer end 41 is supported transversely of a flume 2 by a bent stake 40 passing through openings 42 in the flume and member. A scoop tube 44 having a telescoping extension 46 extends down from member 38 to the bottom of the flume. The length of tube 44 is held in adjusted position by means of a pin 52 engageable through opening 48 in extension 46 and the selected one of a row of openings 50 in tube 44. Preferably, the top of extension 46 is cut away for a short distance back of its open lower end 56, and the bottom wall 58 is angled slightly upward. By means of extension 46, the length and, consequently, the downward angle of disposition of tube 44 may be adjusted to vary the amount of water delivered via member 38 over the side of the flume.

In each of the embodiments described above, the velocity of the flume water is utilized as the impelling force in the deflection of the desired portion of flume water upwardly along an inclined vane surface, and thence sidewise for delivery over the side of the flume.

The invention is not limited to the precise disclosure, but is intended to cover all modifications and equivalents within the scope of the following claims.

I claim:

1. The method of distributing irrigation water, comprising, flowing water at an appreciable velocity along an inclined channel, shaving off a portion only of the flowing water in an upward direction and laterally deflecting the shaved-off water from the stream towards a subsidiary channel, and decreasing the velocity of the upwardly and laterally deflected water before it reaches the subsidiary channel.

2. An irrigation scoop comprising a tube having an open end means for supporting said tube across the top of an open-topped flume with said open end extending exteriorly of the flume, said tube having an open-ended branch extending substantially transversely therefrom and adapted to be disposed in said flume with its open end angling towards the bottom of said flume and upstream of said tube, whereby to deflect and conduct a portion of the passing flume water into said tube and thence to the side of said flume.

3. The combination claimed in claim 2, said branch being telescopic whereby the angle of extension of said branch may be adjusted.

4. The combination claimed in claim 2, said tube having both ends open, said ends respectively extending over opposite edges of said flume, whereby to pass water exteriorly to both sides of said flume.

RUSSELL L. WOLD.

REFERENCES CITED

The following references are of record in the file of this patent:

UNITED STATES PATENTS

| Number | Name | Date |
| --- | --- | --- |
| 159,959 | Parker | Feb. 16, 1875 |
| 845,179 | Koren | Feb. 26, 1907 |
| 845,214 | Bazin | Feb. 26, 1907 |
| 1,077,132 | Erickson | Oct. 28, 1913 |

FOREIGN PATENTS

| Number | Country | Date |
| --- | --- | --- |
| 124,377 | Great Britain | 1919 |